US010468842B2

(12) United States Patent
Sun et al.

(10) Patent No.: US 10,468,842 B2
(45) Date of Patent: Nov. 5, 2019

(54) EXPANDABLE AUDIO VISUAL ADAPTER MODULE WITH MULTI-PORT VOLTAGE AND POWER MANAGEMENT CIRCUITRY

(71) Applicant: Ortronics, Inc., New London, CT (US)

(72) Inventors: Child Kuan Leok Sun, Irvine, CA (US); Craig Davell Petersen, Fullerton, CA (US); Taesuk Yang, Wallingford, CT (US); Dana Wren York, Clayton, OH (US); Jennifer Dawn Crotinger, Oceanside, CA (US); Terry Lynn Smith, Springboro, OH (US); Garry Dukes, Cool, CA (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 15/405,129

(22) Filed: Jan. 12, 2017

(65) Prior Publication Data

US 2018/0198248 A1 Jul. 12, 2018

(51) Int. Cl.
| | |
|---|---|
| *H01R 25/00* | (2006.01) |
| *H01R 31/06* | (2006.01) |
| *G05F 5/00* | (2006.01) |
| *H01R 24/64* | (2011.01) |
| *G06F 1/26* | (2006.01) |
| *H01R 107/00* | (2006.01) |
| *H01R 13/62* | (2006.01) |

(52) U.S. Cl.
CPC .............. *H01R 31/065* (2013.01); *G05F 5/00* (2013.01); *G06F 1/26* (2013.01); *H01R 24/64* (2013.01); *H01R 13/6205* (2013.01); *H01R 2107/00* (2013.01); *H01R 2201/06* (2013.01)

(58) Field of Classification Search
CPC .... H01R 13/6205; H01R 13/72; H01R 31/06; H01R 23/7073
USPC ........................... 439/38, 501, 502, 638, 660
See application file for complete search history.

(56) References Cited

U.S. PATENT DOCUMENTS

| | | | | |
|---|---|---|---|---|
| 4,259,635 A * | 3/1981 | Triplett | ................ | G01R 19/155 324/149 |
| 5,720,628 A * | 2/1998 | Usui | ...................... | H01R 13/60 439/501 |
| 5,729,478 A * | 3/1998 | Ma | ......................... | G06F 1/1632 361/679.41 |
| 6,321,340 B1 * | 11/2001 | Shin | ...................... | G06F 1/1632 439/131 |
| 6,358,204 B1 * | 3/2002 | Finger | ...................... | A61B 8/00 600/437 |
| 6,558,201 B1 * | 5/2003 | Begley | ................... | H01R 31/06 439/638 |

(Continued)

*Primary Examiner* — Than Tam T Le
(74) *Attorney, Agent, or Firm* — McCarter & English, LLP

(57) ABSTRACT

A USB Type-C audio-visual adapter system includes a base module and an expansion module. The base module has a first housing with a first face and a second face, where the first face includes USB and A/V connectors and the second face includes a first expansion connector. The second face is offset inwardly from an edge of the first housing defined by a lip extending about the second face. The expansion module has a second housing with a first face that includes a second expansion connector, where the first face of the second housing is configured to be received within a recessed area formed by the lip of first housing to facilitate mechanical and electrical coupling of the first and second expansion connectors.

28 Claims, 8 Drawing Sheets

(56) References Cited

U.S. PATENT DOCUMENTS

| | | | | |
|---|---|---|---|---|
| 6,671,764 | B2* | 12/2003 | Martin | G06F 13/387 |
| | | | | 439/638 |
| 6,705,891 | B1* | 3/2004 | Lin | G11B 33/02 |
| | | | | 439/501 |
| 6,722,917 | B2* | 4/2004 | Huang | H01R 13/6658 |
| | | | | 439/501 |
| 6,939,177 | B2* | 9/2005 | Kato | H01R 27/02 |
| | | | | 439/607.01 |
| 6,943,527 | B2* | 9/2005 | Liu | G06F 1/1616 |
| | | | | 320/107 |
| 6,945,821 | B2* | 9/2005 | Stoner | H01R 31/06 |
| | | | | 439/638 |
| 6,948,966 | B2* | 9/2005 | Kambayashi | 439/362 |
| 7,318,750 | B1* | 1/2008 | Chacon | H01R 27/02 |
| | | | | 200/51.03 |
| 7,329,128 | B1* | 2/2008 | Awad | H01R 13/6205 |
| | | | | 439/38 |
| 7,467,971 | B2* | 12/2008 | Lin | H01R 13/60 |
| | | | | 191/12.2 R |
| 7,911,757 | B2* | 3/2011 | Hsu | H01R 13/6666 |
| | | | | 307/150 |
| 8,657,630 | B1* | 2/2014 | Nelson | H01R 27/02 |
| | | | | 439/638 |
| 8,936,483 | B2* | 1/2015 | Saunders | H01R 13/627 |
| | | | | 439/351 |
| 9,285,831 | B2* | 3/2016 | Vroom | G06F 1/1632 |

* cited by examiner

EXPANDABLE AUDIO VISUAL ADAPTER MODULE WITH MULTI-PORT VOLTAGE AND POWER MANAGEMENT CIRCUITRY

BACKGROUND

The use of an audio visual (A/V) device to display or otherwise output information can be accomplished by connecting a cable between the source device and the A/V device and configuring the source device to output the A/V data to the A/V device via the cable. However, A/V devices and source device can include a variety of different types of ports, where the ports on the source device and the ports on the A/V device may not be compatible preventing a connection between the source device and the A/V device. In some instances, various adapters and/or cables can be required to ensure that compatible connections can be made between source and A/V devices.

SUMMARY

Exemplary embodiments of the present disclosure are related to an expandable audio-visual adapter module with multi-port voltage and power management circuitry. Embodiments of the present disclosure can include a base module and an expansion module that can be mechanically, electrically, and magnetically coupled to each other. The base module can provide connectors for connecting a host device to an audio-visual device and for connecting the base module to an external power source. The base module can include power delivery circuitry for controlling and negotiating power delivery between the host device, the external power supply, and the expansion module.

In accordance with embodiments of the present disclosure, a USB Type-C audio-visual adapter system is disclosed. The system includes a base module and an expansion module. The base module has a first housing with a first face and a second face. The first face includes USB and A/V connectors. The second face includes a first expansion connector and is offset inwardly from an edge of the first housing defined by a lip extending about the second face. The first housing also includes a first ferromagnetic element disposed proximate to the second face. The expansion module has a second housing with a first face that includes a second expansion connector. The first face of the second housing is configured to be received within a recessed area formed by the lip of first housing to facilitate mechanical and electrical coupling of the first and second expansion connectors. The second housing also includes a second ferromagnetic element disposed proximate to the first face of the second housing. The lip of the first housing engages the second housing when the first and second connectors are mechanically and electrically coupled to restrict movement of the second housing relative to the first housing. The first and second ferromagnetic elements magnetically couple the first housing to the second housing when the first and second connectors are mechanically and electrically coupled.

In accordance with embodiments, a USB Type-C audio-visual adapter is disclosed. The adapter includes first through third ports, first through third controllers, and electronic switches. The first, second, and third ports have a universal serial bus Type-C configuration. The first controller is associated with the first port; the second controller associated with the second port; and the third controller associated with the third port. At least one electronic switch is electrically disposed between the first controller, the second controller, and the third controller. The first, second, and third controllers are configured to select a power delivery mode to utilize and to control an operation of the electronic switches based on the power delivery mode that is selected.

In accordance with embodiments of the present disclosure, a power delivery method in an audio-visual adapter is disclosed. The method includes electrically coupling a host device to a cable of the audio-visual adapter; mechanically and electrically coupling an expansion module to the audio-visual adapter; and indirectly negotiating power delivery between the host device and the expansion module. The method can also include electrically coupling an external power source to the audio-visual adapter and indirectly negotiating power delivery between the host device, the expansion module, and the external power source.

Any combination and/or permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure

DETAILED DESCRIPTION

Exemplary embodiments of the present disclosure are related to an expandable audio-visual adapter module with multi-port voltage and power management circuitry. Embodiments of the present disclosure can include a base module and an expansion module that can be mechanically, electrically, and magnetically coupled to each other. The base module can provide connectors for connecting a host device to an audio-visual device and for connecting the base module to an external power source. The base module can include power delivery circuitry for controlling and negotiating power delivery between the host device, the external power supply, and the expansion module.

As one non-limiting example, the base module can be a universal serial bus Type-C (USB-C) travel adapter including a base module with video connectors (e.g., VGA, HDMI DispalyPort) as well as a USB-C power port. The base module can be used alone or paired with an expansion module, which can include a battery pack and/or a USB hub to add additional functionality and devices. The base unit and the expansion module(s) fit together seamlessly for one, easy to carry solution.

Figure 1:
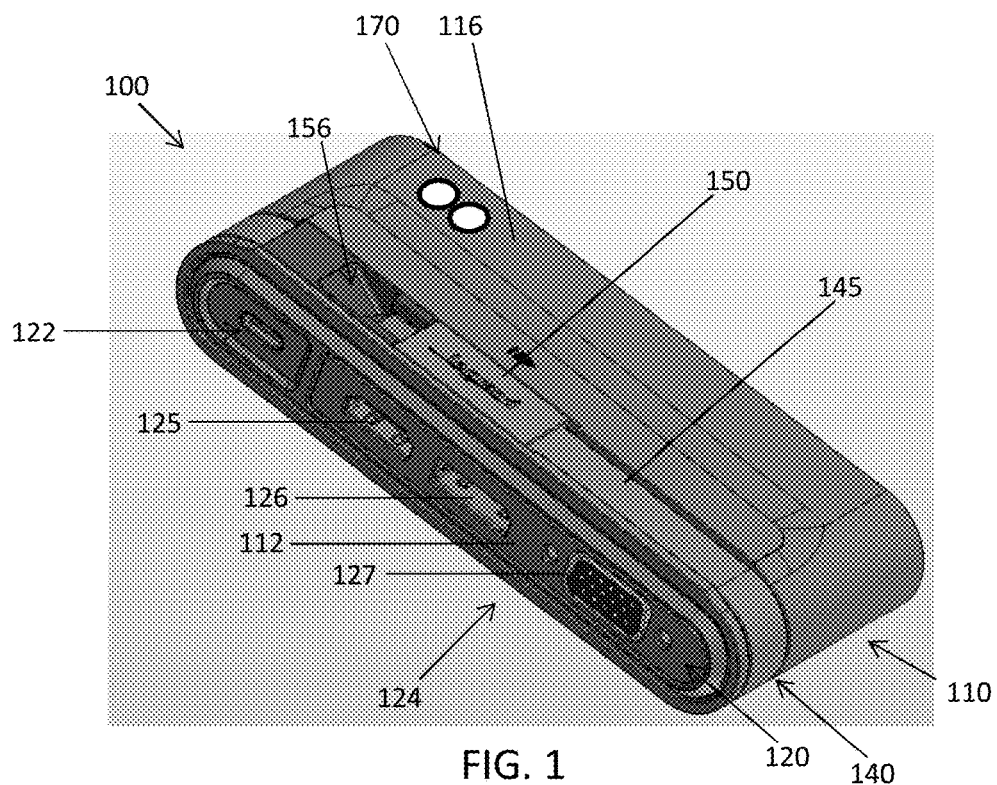
FIG. 1 is a perspective view of a first side of a base module in accordance with embodiments of the present disclosure.
Figure 2:
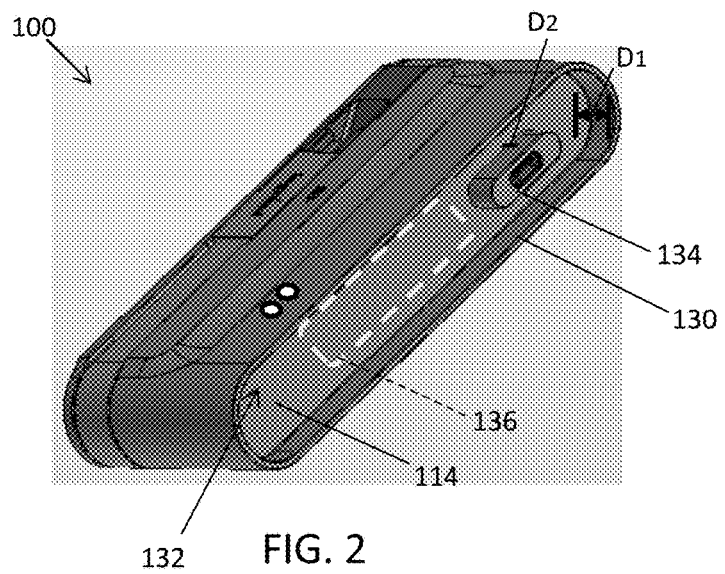
FIG. 2 is a perspective view of a second side of a base module in accordance with embodiments of the present disclosure.
Figure 3:
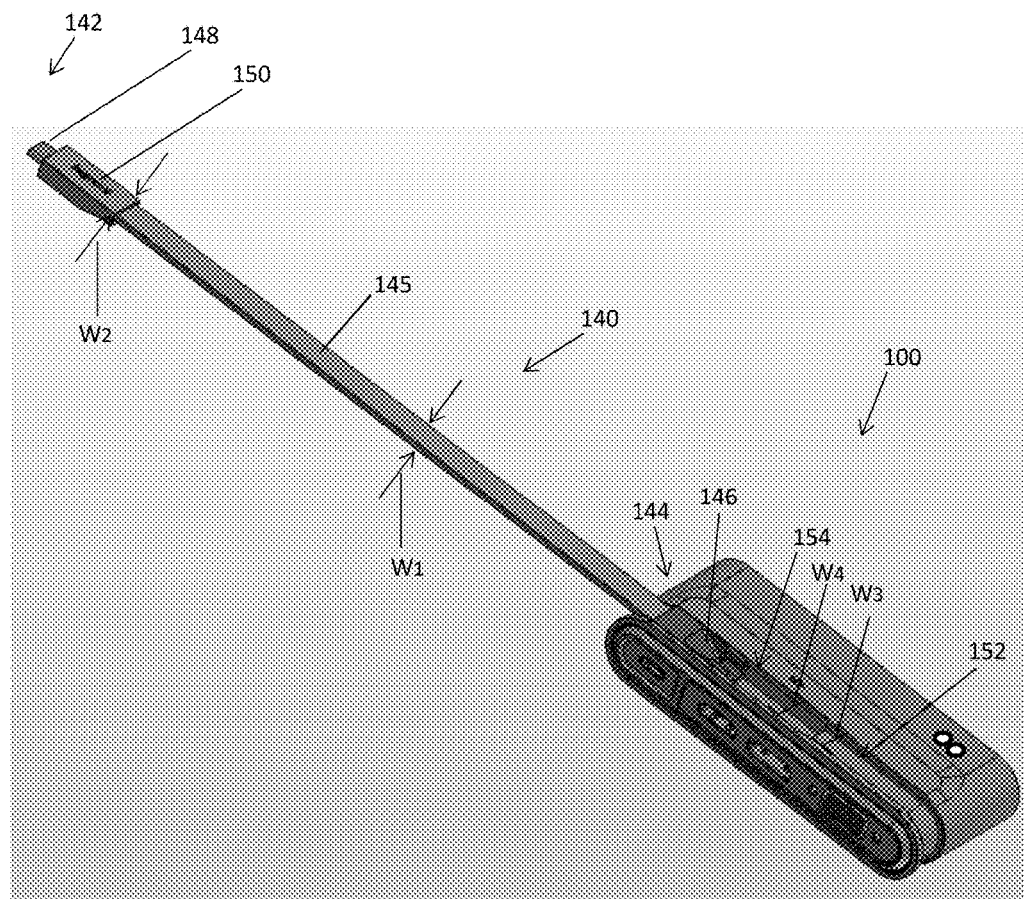
FIG. 3 is a perspective view of a first side of a base module having a cable extending therefrom in accordance with embodiments of the present disclosure.

FIG. 1 is a perspective view of an audio visual travel adapter base module 100 in accordance with embodiments of the present disclosure. FIG. 2 is a perspective view of the base module 100 in accordance with embodiments of the present disclosure. FIG. 3 is a perspective view of the module 100 with a USB cable 140 unwrapped from the housing and extending therefrom in accordance with embodiments of the present disclosure.

Referring to FIGS. 1 and 2, the module 100 can have a housing 110 including a first (or front) face 112, a second (or rear) face 114, and sides 116. The housing 110 can have a generally rounded rectangle shape with a specified corner radius. The first and second faces 112 and 114 can be opposing spaced from each other, and the sides 116 can be disposed between the first face 112 and the second face 114. The first and second faces 112 and 114 can each have a generally planar surface and can extend generally parallel to each other. The sides 116 can encompass a perimeter of the first and second faces 112 and 114.

The first face 112 of the housing 110 can include one or more ports 120 including, for example, a universal serial bus (USB) connector 122 having a Type-C configuration and audio visual (A/V) connector 124 that are electrically coupled to circuitry disposed within the housing 110. The USB connector 122 can provide a port on the module for connecting the module 100 to an external power, which can be used to charge the module 100 as well as expansion modules operatively coupled to the module 100 as described herein. In exemplary embodiments, the USB connector 122 can be a female connector/receptacle. The A/V ports 124 can include a High-Definition Multimedia Interface (HDMI) connector 125, a DisplayPort connector 126, and/or a Video Graphics Array (VGA) connector 127 and can facilitate connection of the module 100 to one or more display device, such as computer monitors, televisions, projectors, and the like.

The second face 114 of the housing 110 can be recessed or offset inwardly with respect to the sides 116 by a distance $D_1$ such that the sides 116 of the housing 110 form a lip 130 around a perimeter of the second face 114 and a recess area 132. The second face 114 can include an expansion connector 134 that is configured to mechanically and electrically coupled the module 100 with an expansion module to facilitate data communication and/or power delivery between the module 100 and an expansion module operatively coupled to the module 100. The expansion connector 134 can be a (female) USB Type-C connector/receptacle and/or can protrude outwardly from the second face 114 a distance $D_2$ that is equal to or less than the distance $D_1$ such that a terminal end of the expansion connector is flush with or recessed with respect to an edge of the lip 130. In exemplary embodiments, a ferromagnetic material can be disposed on or within the housing 110. For example, a ferromagnetic element 136 can be disposed within or on the housing 110 proximate to the second face 114 of the housing 110.

Referring now to FIGS. 1 and 3, the USB cable 140 can be configured to warp around the sides 116 of the housing 110 as shown in FIG. 1 and to be unwrapped from the sides 116 of the housing 110 as shown in FIG. 3. In exemplary embodiments, the USB cable 140 can have a flexible flat or ribbon portion 145 that is configured to closely follow the contours of the sides 116 when the USB cable 140 is in the wrapped position. In exemplary embodiments, the corner radius of the sides can be specified to ensure that the USB cable 140 closely follows and remains in contact with the sides 116 when the USB cable 140 is in the wrapped position.

The USB cable 140 can have a length that is approximately equal to a perimeter of the housing measured around the sides 116 in a direction that is generally parallel to the first and/or second faces 112, 114, and can have a width $W_1$. The USB cable 140 include a first terminal end 142 that terminates on or within the housing and is electrically coupled to circuitry within the housing, and can include a second terminal end 144 that can be mechanically coupled and decoupled from the housing 110. The second terminal end 144 can be mechanically coupled to the housing via a strain relief member 146. The first terminal end 142 can include a (male) USB connector/plug 148 having a Type-C configuration with an over-mold portion 150. The length of the USB cable can be measured between the first terminal end and the second terminal including the USB plug 148. The over-mold portion 150 can be formed of a resilient deformable material such as a polymer including rubber or plastic and can have a width $W_2$ that is greater than the width $W_1$ of the USB cable 140. The USB plug 148 can be configured to facilitate mechanically and electrically connecting an electronic device (e.g., a computer) to the module 100 to facilitate, e.g., data communications and/or power delivery between the electronic device and the module 100.

The sides 116 of the housing 110 can include a recessed cavity or channel 152 extending about the perimeter of the housing 110 (as measured around the sides 116 in a direction that is generally parallel to the first and/or second faces 112, 114). The recessed channel 152 can be dimensioned to receive the USB cable 140 therein. A first end of the channel 152 can originate proximate to a first side of a connection point of the first terminal end 142 of the USB cable 140, and a second end of the channel 152 can terminate proximate to a second side of the connection point of the first terminal end 142 of the USB cable 140, at which the channel 152 can include a cavity 154 dimensioned and configured to receive the over-mold portion 150 of the USB plug 148. A width $W_3$ of the channel 152 can be slightly smaller than a width $W_1$ of the USB cable 140 to create enough friction to hold cable 140 in place and a width $W_4$ of the cavity 154 can approximately equal to or slightly greater than the width $W_2$ of the over-mold portion 150 to form a friction fit between the cavity 154 and the over-mold portion 150.

The cavity 154 at the second end of the channel 152 can include an access area 146 proximate to the second side of the connection point of first terminal end of the USB cable 140. For example, when the USB cable 140 is in the wrapped position and the over-mold portion 150 is inserted into the cavity 154, the access area 146 can be defined as a space between the terminal end of the USB plug 148 and the connection point of the second terminal end of the USB cable 140. The access area 146 can be dimensioned and configured to allow a user to insert a fingertip into the space to pry or urge the over-mold portion 150 outwards and overcome the friction fit between the over-mold portion 150 and the cavity 154. Once the over-mold portion 150 is removed from the cavity 154, the USB cable 140 can be unwrapped from the housing 110 to position the USB cable in the unwrapped position.

Referring again to FIG. 1, the base module 100 can include one or more indicators 170. For example, the one or more indicators can be light emitting diodes that are configured to be illuminated to indicate an operational status of the base module and/or an operational status of one or more of the ports/connectors of the base module.

Figure 4:
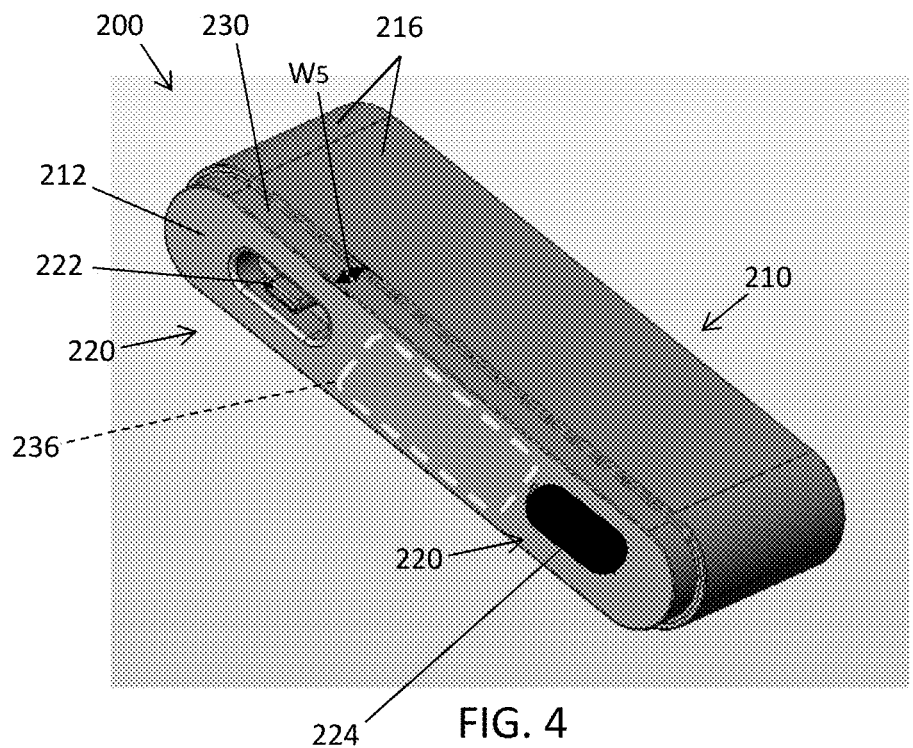
FIG. 4 is a perspective view of a first side of an expansion module in accordance with embodiments of the present disclosure.

FIG. 4 is a perspective view of an expansion module 200 in accordance with embodiments of the present disclosure. The expansion module 200 be operatively coupled to embodiments of the base module 100 shown in FIG. 1 to enhance the operation and/or performance of the module 100. As one example, the expansion module can be a hub that includes one or more expansion ports and/or can be a power source configured to power the module 100 and/or devices operatively coupled to modules 100 and/or 200. The expansion ports can include USB ports, such as USB Type-A connectors, Ethernet connectors, such as one or more RJ45 jacks. The power source can be a rechargeable power source formed by one or more batteries (e.g., battery pack(s)) and/or capacitors. The expansion module 200 can have a housing 210 including a first face 212, a second face, and sides 216. The housing 210 can have a generally rounded rectangle shape with a specified corner radius. The specified corner radius of the housing 210 can correspond to the specified corner radius of embodiments of the module 100 (e.g., as shown in FIGS. 1-3) such that the module 200 has the same or substantial similar (e.g., within manufacturing tolerances) shape and general perimeter as embodiments of the module 100. The first face 212 and second face can be opposing spaced from each other, and the sides 216 can be disposed between the first face 212 and the second face. The first and second faces of the expansion module 200 can each have a generally planar surface and can extend generally parallel to each other. The sides 216 can encompass a perimeter of the first and second faces of the expansion port 200.

The first face 212 of the housing 210 can include one or more ports 220 including, for example, a base expansion port 222 can provide a port on the module 200 for connecting mechanically and electrically connecting the module 200 to the expansion connector 134 of embodiments of the base module 100 shown in FIGS. 1-3 to facilitate data communication and/or power delivery between the expansion module 200 and embodiments of the module 100. In exemplary embodiments, the base expansion port 222 can be a universal serial bus (USB) port having a Type-C configuration that is electrically coupled to circuitry disposed within the housing 210. The one or more ports 220 can also include a port 224 that can be provided for charging devices using a power source of the expansion module 200. In exemplary embodiments, the expansion module 200 can be used as a stand-alone module (e.g., that does not have to be coupled to the base module to provide a function) when a device is being charged via the port 224. The port 224 can be a universal serial bus (USB) port having a Type-C configuration.

The sides 216 of the housing 210 can include a notch 230 proximate to the first face and extending about the perimeter of the housing 210 (as measured around the sides 116 in a direction that is generally parallel to the first and/or second faces). The notch 230 can be dimensioned to be received within the recessed area formed by the lip 130 (FIG. 2) when the expansion module 200 is coupled to embodiments of the module 100. For example, the perimeter of the notch 230 can be smaller than the perimeter defined by the lip 130 such that the notch 230 fits within the recessed area defined by the lip 130. A width $W_5$ of the notch 230 measured from the edge of the first face 212 towards the second face can correspond to the distance D1 by which the second face 114 of the housing 110 is recessed or offset inwardly from an edge of the lip 130 shown in FIG. 1. In exemplary embodiments, a ferromagnetic material can be disposed on or within the housing 210. For example, a ferromagnetic element 236 can be disposed within or on the housing 210 proximate to the first face 212 of the housing 210.

Figure 5:
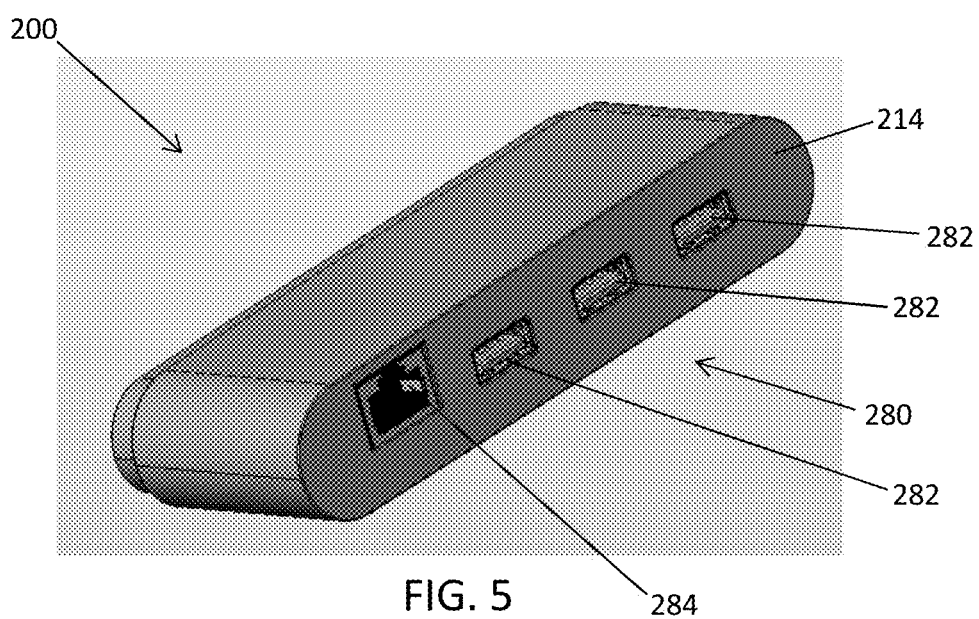
FIG. 5 is a perspective view of a second side of an expansion module in accordance with embodiments of the present disclosure.

FIG. 5 is a perspective view showing a second face 214 of an embodiment of the expansion module 200 in accordance with embodiments of the present disclosure. As shown in FIG. 5, the second face 214 of the example embodiment of the expansion module 200 includes one or more expansion ports 280. The expansion ports 280 can include USB ports 282 and an Ethernet port 284. In exemplary embodiments, the USB ports 282 can have a Type-A configuration, a Type-B configuration, and/or a Type-C configuration, and the Ethernet port 284 can be an RJ45 jack. The expansion module can provide a USB hub via the USB ports 282 to allow other device to be electrically coupled to the base module and the devices electrically coupled to the base module when the expansion module is operatively coupled to the base module. The Ethernet port 284 can provide a network connection to the expansion module, base module, and/or device electrically coupled to the base module (when the base module and the expansion module are electrically coupled).

Figure 6:
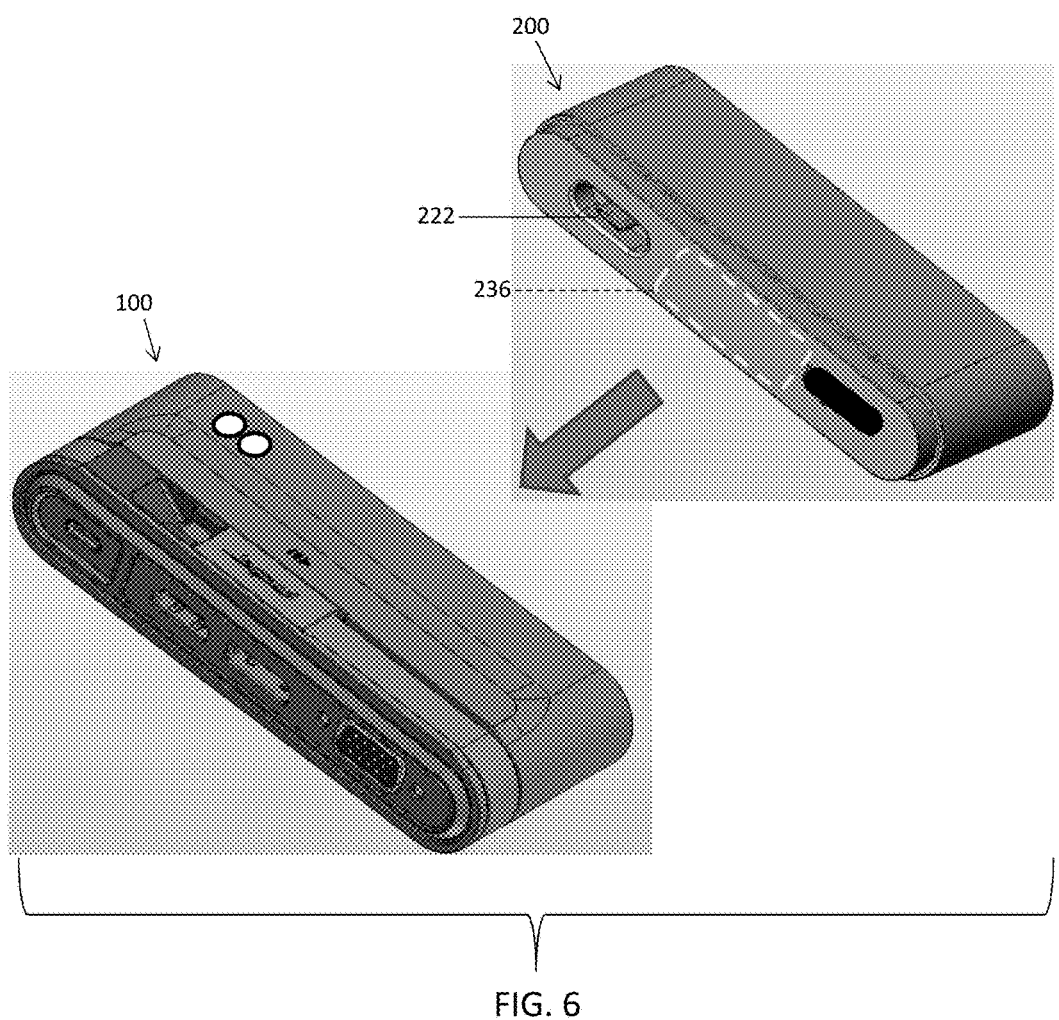
FIG. 6 illustrates connecting an expansion module to a base module in accordance with embodiments of the present disclosure.
Figure 7:
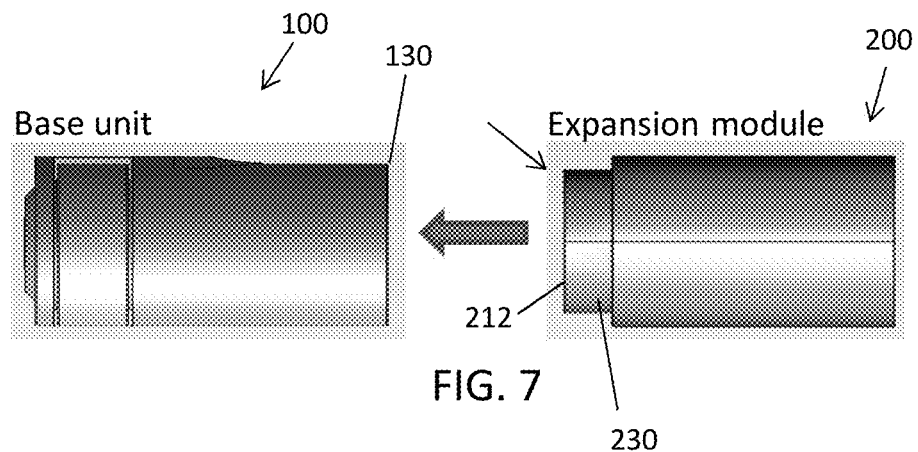
FIG. 7 illustrates a base module and an expansion module in a disconnected state in accordance with embodiments of the present disclosure.
Figure 8:
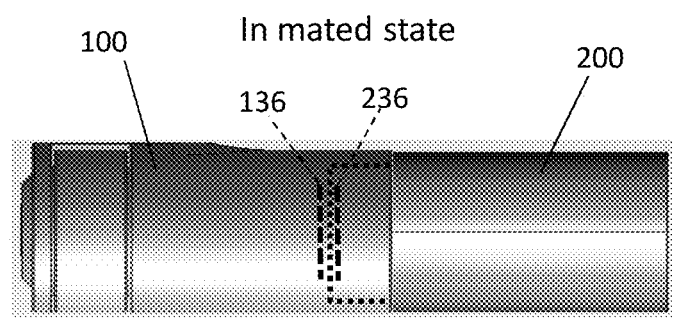
FIG. 8 illustrates a base module and an expansion module in a connected state in accordance with embodiments of the present disclosure.

FIG. 6 illustrates connecting an embodiment of the expansion module 200 to an embodiment of the base module 100 in accordance with the present disclosure. FIG. 7 illustrates the base module 100 and the expansion module 200 in a disconnected state in accordance with embodiments of the present disclosure. FIG. 8 illustrates the base module 100 and the expansion module 200 in a connected state in accordance with embodiments of the present disclosure. As shown in FIGS. 6 and 7, the first face 212 of the expansion module 200 can be urged towards the second face 114 of the base module 100 such that the second face 114 and the first face 212 are aligned with each other and the notch 230 of the expansion module 200 is received within the recess area 132 formed by the lip 130 of the base module 100. As the first face 212 of the expansion module is urged towards the second face 114 of the base module the expansion connect 134 extending from the second face 114 of the base module 100 can engage and mate with the port 222 formed with respect to the first face 212 of the expansion module 200 to form a mechanical and electrical connection. In the connected position, shown in FIG. 8, the notch 230 of the expansion module can be fully received within the recess area formed by the lip 130 of the base module 100 such that the lip 130 engages the notch 230 to further mechanically couple and secure the expansion module 200 to the base module and to substantially resist torsional force to prevent the expansion module 200 from rotating or twisting with respect to the base module 100.

In exemplary embodiments, the ferromagnetic elements 136 and 236 of the base module 100 and the expansion module 200, respectively, can be magnetized and arranged to have opposite magnetic poles such that when the ferromagnetic elements are brought together the ferromagnetic elements are attracted to each other with a magnetic force to magnetically couple the base module 100 to the expansion module 200. To disconnect the expansion module 200 from the base module 100, the base module 100 and the expansion module 200 can be urged away from each other with a force that overcomes the mechanical coupling between the expansion connecter 134 and the port 222, the mechanical coupling between the notch 230 and the lip 130, and the magnetic coupling of the ferromagnetic elements 136 and 236.

Figure 9:
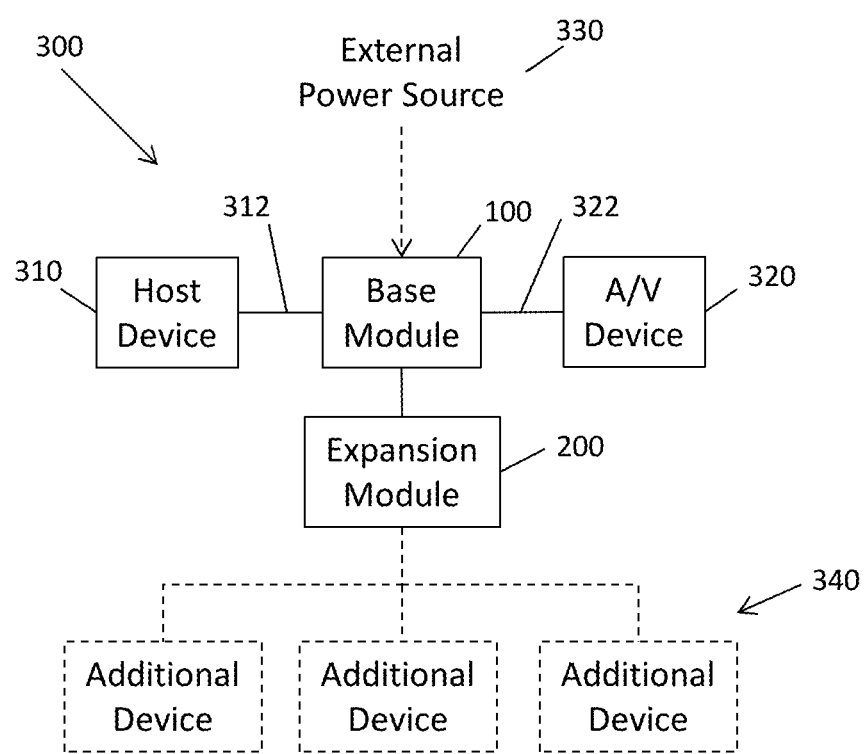
FIG. 9 is a block diagram of power management circuitry housed by a base module in accordance with embodiments of the present disclosure.

FIG. 9 is a block diagram of an exemplary electrical arrangement 300 including an embodiment of the base module 100 and an embodiment of the expansion module 200. As shown in FIG. 9, a host device 310 can be electrically coupled to the base module 100 via a first cable 312 having a first type of connectors (e.g., USB Type-C connectors) and an A/V device 320 can be connected to the base module 100 via a second cable 322 having a second type of connectors (e.g., HDMI, DisplayPort, VGA connectors). The base module 100 can be configured to facilitate communication between the host device 310 and the A/V device 320 (and vice versa) to, e.g., allow the host device to transmit audio and/or visual data to the A/V device 320, which can be configured to output the audio and/or visual data. As a non-limiting example, the host device 310 can be a laptop computer and the A/V device 320 can be a projector or display device.

The base module 100 can also be configured to power and/or charge the host device 310 and/or A/V device 320. As one non-limiting example, an external power source 330 can be electrically coupled to the base module 100 to provide a specified voltage and electrical current, and the base module 100 can be configured to power the host device 310 based on the external power source. As another non-limiting example, the base module 100 can be connected to the expansion module 200, as described herein, which can include one or more power storage devices (e.g., a battery pack). The base module 100 can receive power from the expansion module 200 and can charge the host device 310 via the power received from the expansion module 200 and/or the host device 310 can charge the power storage device(s) in the expansion module 200. The power storage device(s) in the expansion module 200 can also be charged via the external power source. In some embodiments, the expansion module 200 can also include one or more expansion ports (e.g., ports 280 shown in FIG. 5) to facilitate connection to additional devices 340. The base module 100 and the expansion module 200 can exchange data via the electrical connection between the modules 100 and 200.

Figure 10:
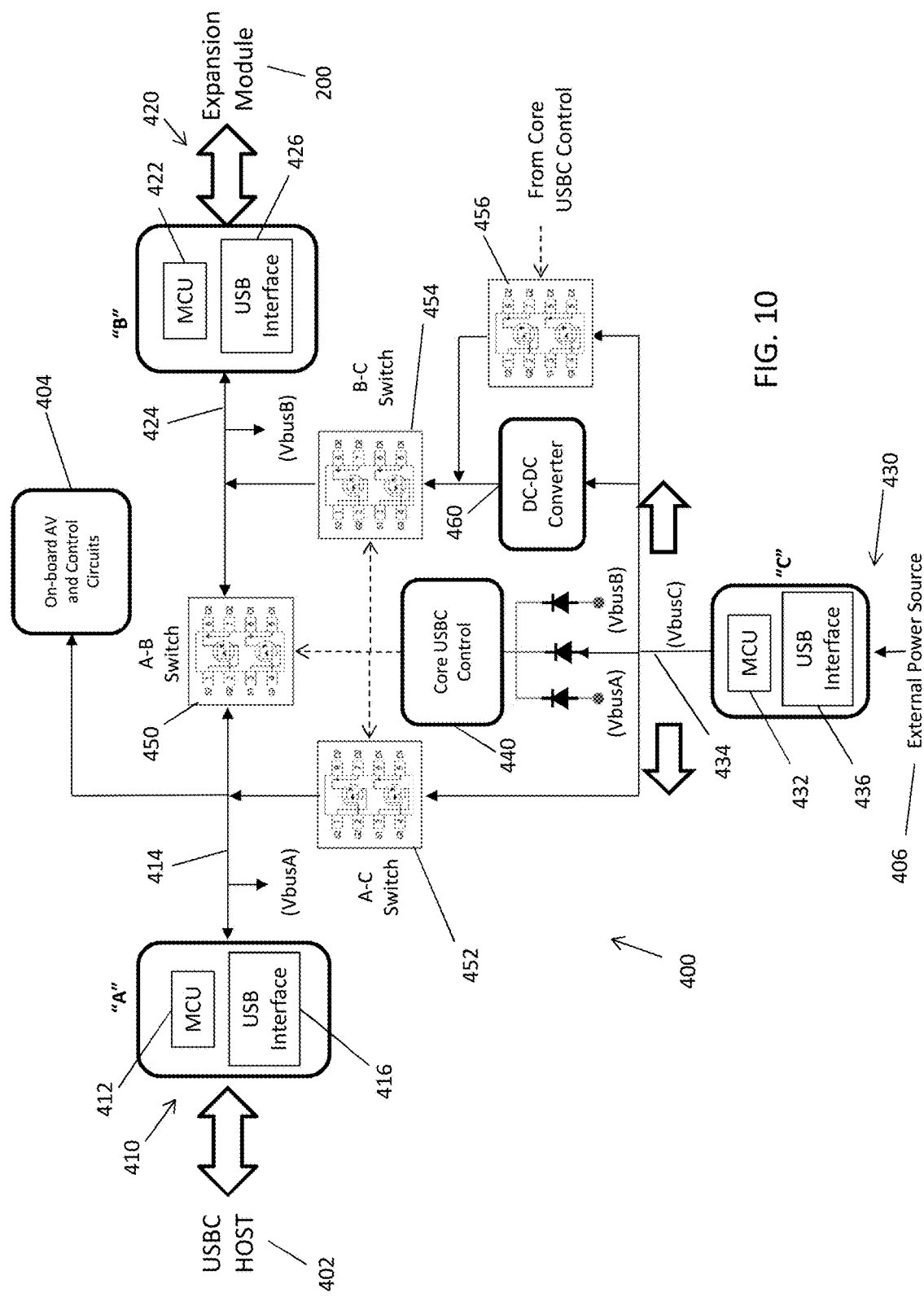
FIG. 10 is a block diagram of power management circuitry housed by a base module in accordance with embodiments of the present disclosure.

FIG. 10 shows a block diagram of power management circuitry 400 for power delivery that can be included in embodiments of the base module 100 in accordance with the present disclosure. The lines connecting the various components of the circuit correspond to the Vbus lines associated with a USB Type-C configuration to facilitate power deliver and powering of the circuitry 400. The configuration of power delivery over the Vbus lines can be determined via one or more other channels or lines of the USB Type-C specification, such as the configuration channel. A USB port 410 can be a USB Type-C port that has its Vbus electrically coupled to a host device 402. The USB port 410 can operate as an upstream facing port source or sink. A USB port 420 can be a Type-C port that has its Vbus be electrical coupled to an embodiment of the expansion module 200. The USB port 420 can operate as a downstream facing port or dual role port source or sink. A USB port 430 can be a Type-C port that has its Vbus electrically coupled to an external power source 406. The USB port 430 can operate as an upstream facing port sink. The USB port 410 can be denoted as node "A" and can be electrically connected to the cable 140 (FIGS. 1-3), the USB port 420 can be denoted as node "B" and can be electrically connected to the expansion connector 134 (FIG. 2), and the USB port 430 can be denoted as node "C" and can be electrically connected to the connector 122 (FIG. 1). The electrical circuit 400 can include A/V control circuits and interfaces 404 for one or more A/V ports of the base module 100. The A/V control circuits and interfaces 404 can be operatively coupled to the USB port 410 to facilitate transmission of data between the host device and one or more A/V devices.

Each of the USB Type-C ports 410, 420, and 430 can be associated with a controller (e.g., controllers 412, 422, and 432, respectively) and USB interfaces (e.g., interfaces 416, 426, and 436) that are configured to negotiate power delivery configuration and requirements between the host device, the expansion module, and the external power source for power delivery via their respective Vbuses. The various configurations and/or requirements for power deliver for each of the controllers 412, 422, and 432 can be managed and/or negotiated via the configuration channels associated with the controllers 412, 422, 432 of the base module 100 and the devices connected to the base module (e.g., the host device, the expansion module, the external power supply) via the USB ports 410, 420, and 430, respectively. The controllers 412, 422, and 432 can be configured to indirectly negotiate power deliver between the USB ports 410, 420, and/or 430 (e.g., represented logically by core USBC control 440).

The circuit 400 can include one or more switches between the Vbus of each of the USB Type-C ports 410, 420, and/or 430 to selectively electrically couple and decouple the Vbuses 414, 424, and 434 of the USB ports 410, 420, and/or 430 to or from each other. For example, in the present example, a switch 450 can be electrically connected between the Vbus 414 of the USB Type-C port 410 and the Vbus 424 of the USB Type-C port 420; a switch 452 can be electrically connected between the Vbus 414 of the USB Type-C port 410 and the Vbus 434 of the USB Type-C port 430; and a switch 454 can be electrically connected between the Vbus 424 of the USB Type-C port 420 and the Vbus 434 of the USB Type-C port 430. In exemplary embodiments, a DC-to-DC converter 460 can be electrically connected between the Vbus 434 of the USB Type-C port 430 and the switch 454, and a bypass switch 456 can be electrically connected between the Vbus 434 of the USB Type-C port 430 and the switch 454 such that the DC-to-DC converter 460 and the bypass switch 456 are connected in parallel to each other. In exemplary embodiments, the DC-to-DC converter 460 can be a Buck regulator. The switches 450, 452, 454, and 456 can be electronic switches (e.g., implemented via one or more transistors) and/or electromechanical switches (e.g., implemented by one or more relays).

The electric circuit 400 can be configured in various power delivery modes, such as those shown in Table 1. Power delivery between the device connected to nodes A and B, nodes A and C, and nodes B and C can be negotiated indirectly by the controllers 412, 422, and 432. The switches 450, 452, and 454 between the ports 410, 420, and 430 (i.e., nodes A, B, and C) can be controlled to be opened and closed based on the power delivery modes being implemented by the power delivery circuitry 400. The controllers 412, 422, and 432 can operate to transition between the various power delivery modes based on which devices and external power sources are connected to the base module, the requirements of the device connected to the base module, and/or a current status of the devices. For example, when the host device 402 is connected to the base module and the expansion module 200 and external power source are not connected to the base module, the controllers 412, 422, and 432 can determine that the base module should operate in the "A-only" power delivery mode. In the "A-only" mode each of the switches 450, 452, and 454 can be open to electrically decouple the nodes A, B, and C from each other, and the Vbus 414 associated with the port 410 can be used to power the A/V control circuits and interfaces 404 via the host device 402.

In the A→B power delivery mode (i.e., node A supplies power to node B), the switch 450 can be closed to electrically couple the ports 410 and 420, and the switches 452 and 454 can be open to electrically decouple the ports 420 and 430. In this mode, the Vbuses 414 and 424 associated with the ports 410 and 420 can be electrically connected through the switch 450 and the host device 402 can deliver power to the expansion module 200 (e.g., to power the circuitry of the expansion module and/or to charge the power source in the expansion module). The controllers 412 and 422 can communicate with each other via their respective configuration channels to negotiate and manage the delivery of power from the host device 402 to the expansion module 200. In the event that the voltage at node B provided by node A is insufficient to properly operate the expansion port (or additional devices connected thereto), one or more indicators (e.g., indicators 170) can be activated to notify the user of this condition.

In the B→A power delivery mode (i.e., node B supplies power to node A), the switch 450 can be closed to electrically couple the ports 410 and 420, and the switches 452 and 454 can be open to electrically decouple the ports 420 and 430. In this mode, the Vbuses 414 and 424 associated with the ports 410 and 420 can be electrically connected through the switch 450 and the expansion module 200 can deliver power to the host device 402 (e.g., to power and/or charge the host device). The controllers 412 and 422 can communicate with each other via their respective configuration channels to negotiate and manage the delivery of power from the expansion module 200 to the host device 402. Power between nodes A and B is negotiated indirectly and the voltages at nodes A and B are approximately equal In the C→B power delivery mode (i.e., node C supplies power to node B), the switch 450 and 452 can be open to electrically decouple couple the ports 410 and 420 and the ports 410 and 430, respectively, and the switch 454 can be closed to electrically couple the ports 420 and 430. In this mode, the Vbuses 424 and 434 associated with the ports 410 and 430 can be electrically connected through the switch 452 and switch 456 or the DC-DC converter 460, and the external power source electrically coupled to the port 430 can deliver power to the expansion module (e.g., to power and/or charge the expansion module). The controllers 412 and 432 can communicate with each other via their respective configuration channels to negotiate and manage the delivery of power from the external power source to the expansion module 200. Power from C to B is negotiated indirectly, and the voltages at node B is approximately equal to or less than the voltage at node C. For example, in some arrangements, the bypass switch 456 can be open and the voltage from the external power source connected to node C can be input to the DC-DC converter 460. The DC-DC converter 460 can output a voltage to node B that is approximately equal to or less than the voltage provided from the external power source. In other arrangements, the bypass switch 456 can be closed such that the DC-DC converter 160 is bypassed and the voltage from the external power source is provided from node C to node B. In the event that the voltage at node B provided by node C is insufficient to properly operate the expansion port (or additional devices connected thereto), one or more indicators (e.g., indicators 170) can be activated to notify the user of this condition.

In the C→A power delivery mode (i.e., node C supplies power to node A), the switch 452 can be closed to electrically couple the ports 410 and 430, the switch 450 can be open to electrically decouple the ports 410 and 420, and the switch 454 can be open to electrically decouple the ports 420 and 430. In this mode, the Vbuses 414 and 434 associated with the ports 410 and 430 can be electrically connected through the switch 452 and the external power source electrically coupled to the port 430 can deliver power to the host device 402 (e.g., to power and/or charge the host device). The controllers 412 and 432 can communicate with each other via their respective configuration channels to negotiate and manage the delivery of power from the external power source to the host device 402. Power from C to A is negotiated indirectly, and the voltages at nodes A and C are approximately equal.

In the C→A+B power delivery mode (i.e., node C supplies power to nodes A and B), the switch 452 can be closed to electrically couple the ports 410 and 430, the switch 454 can be closed to electrically couple the ports 420 and 430, and the switch 450 can be open to electrically decouple the ports 410 and 420. In this mode, the Vbuses 414 and 434 associated with the ports 410 and 430 can be electrically connected through the switch 452, and the Vbuses 424 and 434 associated with the ports 420 and 430 can be electrically connected through the switch 454. The external power source electrically coupled to the port 430 can deliver power to the host device 402 (e.g., to power and/or charge the host device) via the switch 452, and the external power source can deliver power to the expansion module (e.g., to power and/or charge the expansion module) via the switch 454. The controllers 412 and 432 can communicate with each other via their respective configuration channels to negotiate and manage the delivery of power from the external power source to the host device 402. The controllers 422 and 432 can communicate with each other via their respective configuration channels to negotiate and manage the delivery of power from the external power source to the expansion module 200. Power from C to A is negotiated indirectly, and the voltages at nodes A and C are approximately equal. Power from nodes C to B is negotiated indirectly, and the voltage at node B is approximately equal to or less than the voltage at node C. For example, in some arrangements, the bypass switch 456 can be open and the voltage from the external power source connected to node C can be input to the DC-DC converter 460. The DC-DC converter 460 can output a voltage to node B that is approximately equal to or less than the voltage provided from the external power source. In other arrangements, the bypass switch 456 can be closed such that the DC-DC converter is bypassed and the voltage from the external power source is provided from node C to node B. In the event that the voltage at node B provided by node C is insufficient to properly operate the expansion port (or additional devices connected thereto), one or more indicators (e.g., indicators 170) can be activated to notify the user of this condition.

TABLE 1

Power Delivery Configurations

| Power Deliver Mode | A-B Switch (switch 450) | A-C Switch (switch 452) | B-C Switch (switch 454) |
|---|---|---|---|
| A-only (operational AM) | Open | Open | Open |
| A → B (operational AM + Powering B) | Closed | Open | Open |
| B → A (operational AM + Charging A) | Closed | Open | Open |
| C → A (operational AM + Charging A) | Open | Closed | Open |
| C → B (Powering B) | Open | Open | Closed |
| C → A + B (operational AM + Charging A & Powering B) | Open | Closed | Closed |

Figure 11:
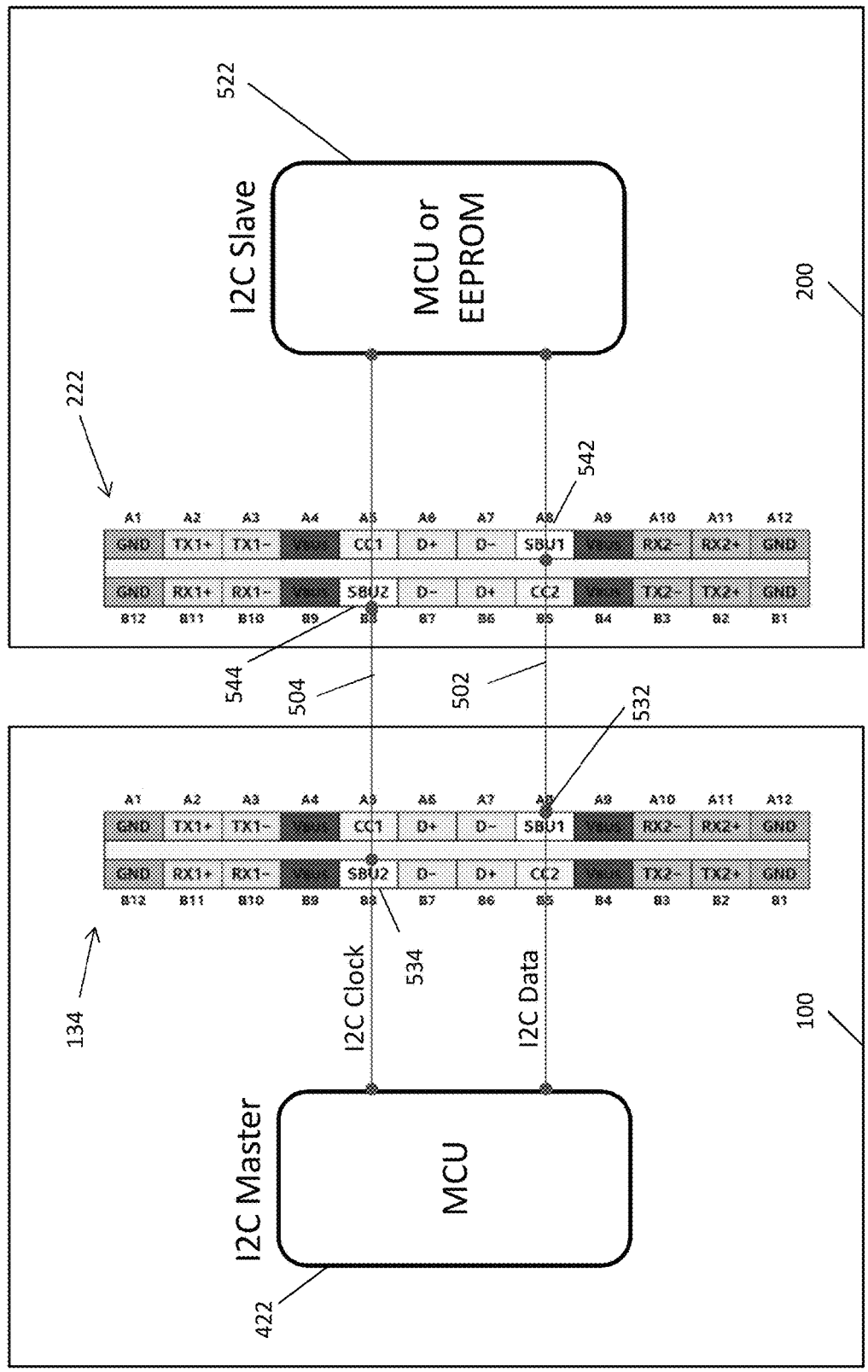
FIG. 11 illustrates an exemplary communication scheme to facilitate communication and power transfer between a base module and an expansion module.

*"AM" denotes Alternate Mode for USB Type-C connections in which devices operatively coupled to the base module support USB Type-C Alternate Mode data communication FIG. 11 illustrates an exemplary communication scheme to facilitate communication and power transfer between a base module and an expansion module. The controller 422 of the port 430 of the base module 100 can communicate with a controller 522 of the expansion module 200 via an electrical bus connection formed by expansion connector 134 and base expansion connector 222. The base module 100 and the expansion module can utilize the I²C communication protocol over USB and the controller 422 can operate as the master I²C controller, while the controller 522 can operate as the slave I²C controller. The SBU1 and SBU2 channels 502 and 504 of the USB Type C interface are open for custom definition and can be used to facilitate data communication between the base module 100 and the expansion module 200, where the SBU1 channel 502 forms the I²C data channel and the SBU2 channel 504 forms the I²C clock channel. When the connectors 134 and 222 are electrically coupled, a SBU1 pin 532 of the connector 134 is electrically coupled to a SBU1 542 of the connector 222 and a SBU2 pin 534 of the connector 134 is electrically coupled to an SBU2 pin 544 of the connector 222 to form the channels 502 and 504, respectively.

In exemplary embodiments, the base module 100 and the expansion module 200 can utilize the SBU1 and SBU2 channels for expansion module identification such that the base module can determine or ascertain the type and/or functions of the expansion module 200 upon connecting the expansion module 200 to the base module 100. The base module 100 can also control an operation of the expansion module (e.g., to shut-down the expansion module, to turn on the expansion module, to control one or more indicators or ports on the expansion module). The base module 100 can also determine or ascertain an operating status of the expansion module via the SBU1 and SBU2 channels 502 and 504, respectively (e.g., battery capacity, charging status, etc.).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

The invention claimed is:

1. A Universal Serial Bus (USB) Type-C audio-visual adapter system comprising:
    a base module having a first housing defined by a first face opposingly spaced from and disposed parallel to a second face and sides encompassing the first and second faces, the first face including a plurality of connectors and the second face being offset inwardly in a direction of the first face from a rear edge of the sides of the housing to define a recessed area and a lip extending about and encompassing a perimeter of the second face, the base module including a first USB connector formed on the second face, the first USB connector forming a receptacle that is distinct from the second face and the lip; and
    an expansion module having a second housing defined by a first face opposingly spaced from and disposed parallel to a second face and sides encompassing the first and second faces, the first face including a second USB connector and the second face including a plurality of connectors, the first face of the second housing being configured to be received within the recessed area defined by the lip formed by the sides of first housing to facilitate mechanical and electrical coupling of the first and second USB connectors and mechanical coupling of the first and second housings,
    wherein the lip formed by the sides of the first housing engages the sides of the second housing when the first and second USB connectors are mechanically and electrically coupled to restrict movement of the second housing relative to the first housing.

2. The system of claim 1, wherein a first one of the plurality of connectors being configured for connecting to an external power source and a second one of the plurality of connectors being configured for connecting to an audio-visual device.

3. The system of claim 2, wherein the first one of the plurality of connectors is a universal serial bus connector having a Type-C configuration.

4. The system of claim 2, wherein the second one of the plurality of connectors is an HDMI connector, a DisplayPort connector, or a VGA connector.

5. The system of claim 4, wherein a third one of the plurality of connectors is an HDMI connector, a DisplayPort connector, or a VGA connector.

6. The system of claim 2, wherein base module further comprises:
    a cable having a length measured between a first end and a second end of the cable, the first end including a universal serial bus plug, the second end being connected to the housing via a strain relief element.

7. The system of claim 6, wherein sides of the first housing include a recessed channel extending about the perimeter of the first housing for receiving the cable.

8. The system of claim 7, wherein the cable is moveable between a wrapped position in which the length of the cable engages the recessed channel about the perimeter of the first housing and an unwrapped position in which the length of the cable extends away from the first housing.

9. The system of claim 1, wherein the expansion module includes a power source.

10. The system of claim 1, wherein at least one of the plurality of connectors is a universal serial bus connector having one of a Type-C configuration, a Type-B configuration, or a Type-A configuration.

11. The system of claim 1, wherein at least one of the plurality of connectors is an RJ45 jack.

12. The system of claim 1, further comprising:
a first ferromagnetic element disposed within the first housing proximate to the second face of the first housing; and
a second ferromagnetic element disposed within the second housing proximate to the first face of the second housing,
wherein the first and second ferromagnetic elements magnetically couple the first housing to the second housing when the first and second connectors are mechanically and electrically coupled.

13. The system of claim 1, wherein the second housing includes a notch proximate to the first face and extending about the perimeter of the second housing,
wherein the perimeter dimensions of the first face are smaller than the perimeter dimensions of the lip, and the lip engages the notch when the first face of the second housing is received in the recessed area.

14. The system of claim 1, wherein the first USB connector protrudes outwardly from the second face into the recessed area, wherein the terminal end of the first USB connector and the second face define a distance less than or equal to a distance defined by the lip with respect to the second face.

15. The system of claim 1, wherein the first USB connector is positioned offset from a center of the second face.

16. The system of claim 1, wherein the second face of the second housing includes a plurality of connectors.

17. The system of claim 16, wherein a first one of the plurality of connectors is a universal serial bus connector and a second one of the plurality of connectors is an Ethernet connector.

18. A power delivery method in an audio-visual adapter, the method comprising:
electrically coupling a host device to a flexible cable of the audio-visual adapter;
mechanically and electrically coupling an expansion module to the audio-visual adapter,
 a. the audio-visual adapter having a first housing defined by a first face opposingly spaced from and disposed parallel to a second face and sides encompassing the first and second faces, the second face being offset inwardly in a direction of the first face from a rear edge of the sides of the housing to define a recessed area and a lip extending about and encompassing a perimeter of the second face, the audio-visual adapter including a first USB connector formed on the second face, the first USB connector forming a receptacle that is distinct from the second face and the lip,
 b. the expansion module having a second housing defined by a first face opposingly spaced from and disposed parallel to a second face and sides encompassing the first and second faces, the first face including a second USB connector, the first face of the second housing being configured to be received within the recessed area defined by the lip formed by the sides of first housing to facilitate mechanical and electrical coupling of the first and second USB connectors,
 c. wherein the lip formed by the sides of the first housing engages the sides of the second housing when the first and second USB connectors are mechanically and electrically coupled to restrict movement of the second housing relative to the first housing; and
indirectly negotiating power delivery between the host device and the expansion module via one or more controllers or one or more switches in the audio-visual adapter.

19. The method of claim 18, further comprising:
electrically coupling an external power source to the audio-visual adapter; and
indirectly negotiating power delivery between the host device, the expansion module, and the external power source.

20. The method of claim 18, further comprising:
electrically coupling the audio-visual adapter to an audio-visual device; and
establishing data communication between the host device and the audio visual device via the electrical coupling of the host device and the audio-visual device to the audio-visual adapter.

21. A Universal Serial Bus (USB) Type-C audio-visual adapter system comprising:
a base module having a first housing defined by a first face opposingly spaced from and disposed parallel to a second face and sides encompassing the first and second faces,
 a. the first face including a plurality of connectors that are electrically coupled to circuitry disposed within the first housing,
 b. the second face being offset inwardly in the direction of the first face from an edge of the sides of the housing to define a recessed area between the second face and the edge of the sides of the housing, the recessed area and the sides of the housing define a lip extending about and encompassing a perimeter of the second face,
 c. the second face including a first USB connector that protrudes perpendicularly outwardly from the second face into the recessed area, the first USB connector being electrically coupled to circuitry disposed within the first housing,
 d. the sides including a USB cable having a flexible flat or ribbon portion configured to be removably wrapped around the sides of the first housing, the USB cable having a first terminal end opposingly spaced from a second terminal end along a length of the USB cable, the second terminal end configured to be mechanically coupled to the housing, the first and second terminal ends are electrically coupled to the circuitry disposed within the first housing; and
an expansion module having a second housing defined by a first face opposingly spaced from and disposed parallel to a second face and sides encompassing the first and second faces,
 a. the sides of the housing including a notch proximate to the first face and extending about a perimeter of the first face,
 b. the first face including a second USB connector, the second USB connector disposed inwardly from the first face and defining a second recessed area surrounding the second USB connector, the second USB connector electrically coupled to circuitry within the second housing, c. the first face of the second housing being configured to be received within the recessed area defined by the lip formed by the sides of the first housing to facilitate mechanical and electrical coupling of the first and second USB connectors and mechanical coupling of the first and second housings, the first USB connector configured to be received within the second recessed area surrounding the second USB connector, d. the second face of the second housing including a second plurality of connectors, the second plurality of connectors are electrically coupled the circuitry within the second housing, the second plurality of connectors being electrically coupled to the base module when the expansion module is operatively coupled to the base module, wherein the lip formed by the sides of the first housing engages the notch of the second housing when the first and second USB connectors are mechanically and electrically coupled to restrict movement of the second housing relative to the first housing.

22. The system of claim 21, wherein the first USB connector is positioned offset from a center of the second face.

23. The system of claim 21, wherein a first one of the plurality of connectors being configured for connecting to an external power source and a second one of the plurality of connectors being configured for connecting to an audio-visual device.

24. The system of claim 23, wherein the first one of the plurality of connectors is a universal serial bus connector having a Type-C configuration.

25. The system of claim 23, wherein the second one of the plurality of connectors is an HDMI connector, a DisplayPort connector, or a VGA connector.

26. The system of claim 25, wherein a third one of the plurality of connectors is an HDMI connector, a DisplayPort connector, or a VGA connector.

27. The system of claim 21, wherein at least one of the second plurality of connectors is a universal serial bus connector having one of a Type-C configuration, a Type-B configuration, or a Type-A configuration.

28. The system of claim 21, wherein at least one of the second plurality of connectors is an RJ45 jack.

\* \* \* \* \*